United States Patent

Collins et al.

[11] Patent Number: 6,054,195
[45] Date of Patent: Apr. 25, 2000

[54] METHOD OF CONSTRUCTION OF EVACUATED GLAZING

[75] Inventors: Richard Edward Collins, Riverstone; Jian-Zheng Tang, Merrylands, both of Australia

[73] Assignee: University of Sydney, New South Wales, Australia

[21] Appl. No.: 09/234,933

[22] Filed: Jan. 21, 1999

Related U.S. Application Data

[62] Division of application No. 08/571,913, filed as application No. PCT/AU95/00305, Jun. 7, 1994.

[30] Foreign Application Priority Data

Oct. 19, 1994 [AU] Australia ................. PM8889

[51] Int. Cl.⁷ ................. E06B 3/66; C03C 27/00
[52] U.S. Cl. ................. 428/34; 156/107; 156/109; 52/786.1
[58] Field of Search ................. 428/34; 52/786.1; 156/107, 109

[56] References Cited

U.S. PATENT DOCUMENTS

| | | |
|---|---|---|
| 1,370,974 | 3/1921 | Kirlin . |
| 2,401,552 | 6/1946 | Cox . |
| 3,350,553 | 10/1967 | Cline ................. 428/34 |
| 3,783,084 | 1/1974 | Quenett . |
| 3,916,871 | 11/1975 | Estes et al. . |
| 3,936,553 | 2/1976 | Rowe . |
| 3,990,201 | 11/1976 | Falbel . |
| 4,132,218 | 1/1979 | Bennett . |
| 4,169,985 | 10/1979 | Ernsthausen et al. . |
| 4,180,426 | 12/1979 | Oustin et al. . |
| 4,367,108 | 1/1983 | Valimont et al. . |
| 4,647,327 | 3/1987 | Rase . |
| 4,683,154 | 7/1987 | Benson et al. . |
| 4,786,344 | 11/1988 | Beuther . |
| 4,941,302 | 7/1990 | Barry ................. 428/34 |
| 5,009,218 | 4/1991 | Bachli . |
| 5,107,649 | 4/1992 | Benson et al. . |
| 5,124,185 | 6/1992 | Kerr et al. . |
| 5,270,084 | 12/1993 | Parker . |
| 5,657,607 | 8/1997 | Collins et al. . |
| 5,664,395 | 9/1997 | Collins et al. . |
| 5,897,927 | 4/1999 | Tsai et al. ................. 428/34 |

FOREIGN PATENT DOCUMENTS

| | | |
|---|---|---|
| 210 104 | 7/1957 | Australia . |
| 16618/67 | 7/1969 | Australia . |
| B-67280/87 | 11/1990 | Australia . |
| 61738/90 | 4/1991 | Australia . |
| PCT/AU90/ 00364 | 5/1991 | Australia . |
| 1290624 | 10/1991 | Canada . |
| 0 047 725 B1 | 12/1985 | European Pat. Off. . |
| 0 421 239 A2 | 4/1991 | European Pat. Off. . |
| 0 247 098 B1 | 3/1992 | European Pat. Off. . |
| 0 645 516 A2 | 3/1995 | European Pat. Off. . |
| 0489 042 B1 | 6/1996 | European Pat. Off. . |

(List continued on next page.)

2294315 12/1974 France .

(List continued on next page.)

*Primary Examiner*—Donald Loney
*Attorney, Agent, or Firm*—Kennedy Covington Lobdell & Hickman

[57] ABSTRACT

A thermally insulating glass panel comprises two spaced apart sheets of glass enclosing a low pressure space and interconnected by a glass solder edge seal and an array of support pillars, and further comprises a pump-out tube which penetrates one of the glass sheets and has a radial flange which is cemented to the inner surface of that glass sheet. A method of constructing a thermally insulating glass panel includes the step of installing a pump-out tube through one of the glass sheets of the panel with the pump-out tube having a radial flange that is sealed to the interior surface of the glass sheet.

4 Claims, 1 Drawing Sheet

FOREIGN PATENT DOCUMENTS

| | | |
|---|---|---|
| 2300860 | 10/1976 | France . |
| 2 367 180 | 5/1978 | France . |
| 2 483 564 | 12/1981 | France . |
| 387655 | 1/1924 | Germany . |
| 1 046 294 | 12/1958 | Germany . |
| 2 152 071 | 2/1973 | Germany . |
| 25 20 062 A1 | 11/1976 | Germany . |
| 29 51 330 A1 | 7/1981 | Germany . |
| 36 15 179 A1 | 2/1987 | Germany . |
| 5-302477 | 11/1993 | Japan . |
| 588 008 | 5/1977 | Switzerland . |
| 683855 | 12/1950 | United Kingdom . |
| 1 100 837 | 1/1968 | United Kingdom . |
| 1 108 593 | 4/1968 | United Kingdom . |
| WO 93/15296 | 9/1993 | WIPO . |
| WO 94/24398 | 10/1994 | WIPO . |
| WO 95/01493 | 1/1995 | WIPO . |

METHOD OF CONSTRUCTION OF EVACUATED GLAZING

This is a divisional U.S. patent application claiming priority under 35 U.S.C. § 120 from allowed U.S. patent application Ser. No. 08/571,913 filed Mar. 27, 1996 for *Methods of Construction of Evacuated Glazing*, which is a national patent application of international patent application serial no. PCT/AU/00305 filed Jun. 7, 1994, which in turn claims priority under 35 U.S.C. § 119 to Australian patent application serial no. PL 9708 filed Jun. 30, 1993.

The invention described in this specification concern an improvement to the design of thermally insulating glass panels. These panels typically comprise two spaced apart sheets of glass enclosing a low pressure space and interconnected by an edge seal and an array of support pillars. The panels are used for glazing, and such thermally insulating windows are generally referred to as evacuated glazing.

BACKGROUND OF THE INVENTION

Thermally insulating panels are typically constructed by depositing a strip of solder glass around the periphery of the glass sheets; depositing an array of support pillars onto one or other of the sheets of glass; bringing the sheets together or permitting them to move together; heating the panels to melt the solder glass around the periphery so that the two sheets settle onto the pillars; and then cooling the panel to solidify the edge seal. The panel is then evacuated by pumping out through a tube positioned either through one of the glass sheets or through the edge seal, and finally the pump-out tube is melted and sealed off.

The improvement concerns the evacuation of the panels, and in particular a method of improving the evacuation of the panels during construction, and a panel produced by the improved method.

Several conditions must be satisfied in the construction of evacuated glazing. First, it is necessary to produce an hermetic (leak-free) edge seal around the periphery of the panel. Second, in order to prevent the glass sheets from being forced into contact with each other, by the large atmospheric pressure forces acting, it is essential to include an array of support pillars within the glazing. Third, the space between the glass sheets must be evacuated to a high level, and this level of vacuum maintained over the life of the glazing. Fourth, in order to reduce radiative heat flow through the glass, a low emittance coating is applied to the inner surfaces of one or both sheets of glass.

In order to evacuate and seal evacuated glazings, it is necessary to incorporate into their structure a small pump-out tube through which evacuation occurs, The tube is necessary because, after the evacuation and bakeout of the structure, the hole through which the evacuation takes place must be sealed. It is difficult to do this directly on the surface of the glass sheets because the sealing process involves high temperatures which cause stresses in the glass sheets. The end of a small tube can be melted and sealed, however, without the necessity to heat the body of the panel which is being evacuated.

Typically a small glass tube is sealed into a hole which passes through one of the glass sheets using low melting point glass (solder glass). It has been found that using solder glass to seal an abraded glass surface results in joints which have a high probability of leakage, due to gas flow in the abraded region of the glass beneath the solder glass. It is therefore common practice to seal the tube onto the smooth unmachined inner surface of the glass sheet in order to make a leak-free joint. However, one of the problems with this, is that cracks occasionally occur in the relatively exposed solder glass seal between the pump-out tube and the glass sheet. The cracks arise because the thermal expansion of the solder glass does not exactly match that of the glass sheet. Tensile stresses therefore build up in the solder glass at the seal which may result in the formation of cracks.

SUMMARY OF THE INVENTION

According to the first aspect, the invention provides a thermally insulating glass panel, comprising two spaced apart sheets of glass enclosing a low pressure space and interconnected by an edge seal and an array of support pillars; and further comprising a pump-out tube which penetrates one of the glass sheets and has a radial flange which is cemented to the inner surface of that glass sheet.

The flange may be cemented to the interior surface of the glass sheet by the use of solder glass. Also, the pump-out tube may extend from the interior of the panel through one of the glass sheets to a recess in the outer surface of that sheet, such that the tube does not extend beyond the outer surface of the glass sheet.

The provision of a flange on the pump-out tube, preferably at the interior end, constrains the solder glass cement. In this way it is possible to achieve a very strong joint which does not suffer from the fracture problems of the prior art.

In a further aspect, the invention concerns a method of constructing a thermally insulating glass panel comprising two spaced apart sheets of glass enclosing a low pressure space interconnected by an edge seal and an array of pillars, the method including the step of installing a pump-out tube through one of the glass sheets, whereby the pump-out tube has a radial flange which is sealed to the interior surface of the glass sheet.

BRIEF DESCRIPTION OF THE DRAWINGS

The same reference numerals have been used in both drawings to refer to corresponding elements.

BEST MODE OF CARRYING OUT THE INVENTION

Figure 1A:
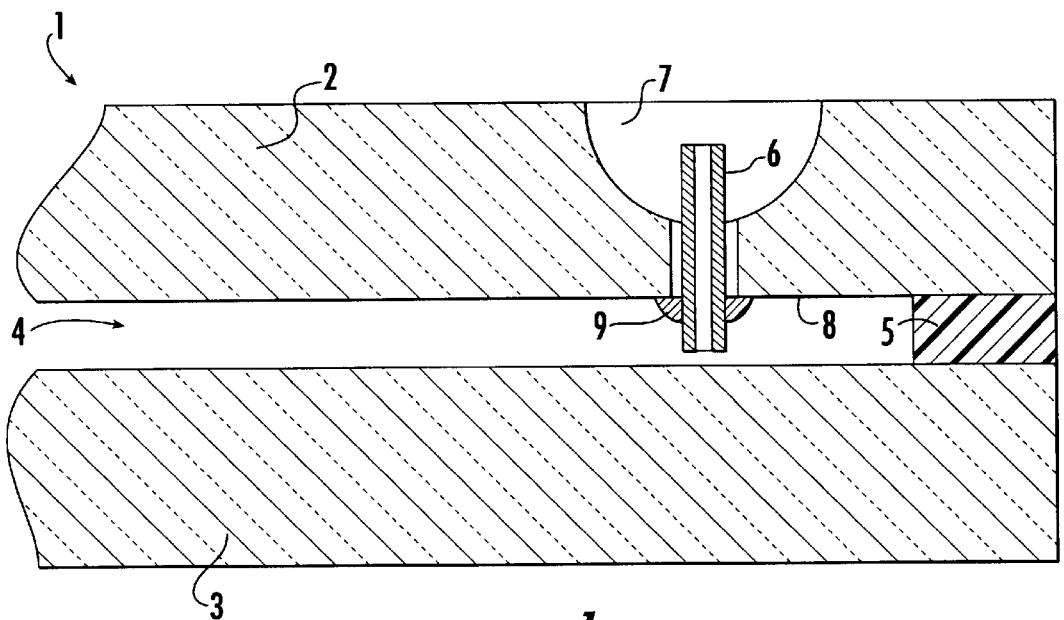
FIG. 1*a* is a sectional view through the edge of a thermally insulated glass panel showing a known pump-out tube arrangement.

Referring now to FIG. 1*a*, thermally insulating glass panel 1 comprises two spaced apart sheets of glass 2 and 3 enclosing a low pressure space 4. Glass sheets 2 and 3 are interconnected by an array of support pillars (not shown) and an edge seal 5. A pump-out tube 6 extends through glass sheet 2 from the interior space 4 to the bottom of a well 7 in the exterior surface of glass sheet 2. Tube 6 is sealed to the interior surface 8 of glass sheet 2 by solder glass cement 9.

Figure 1B:
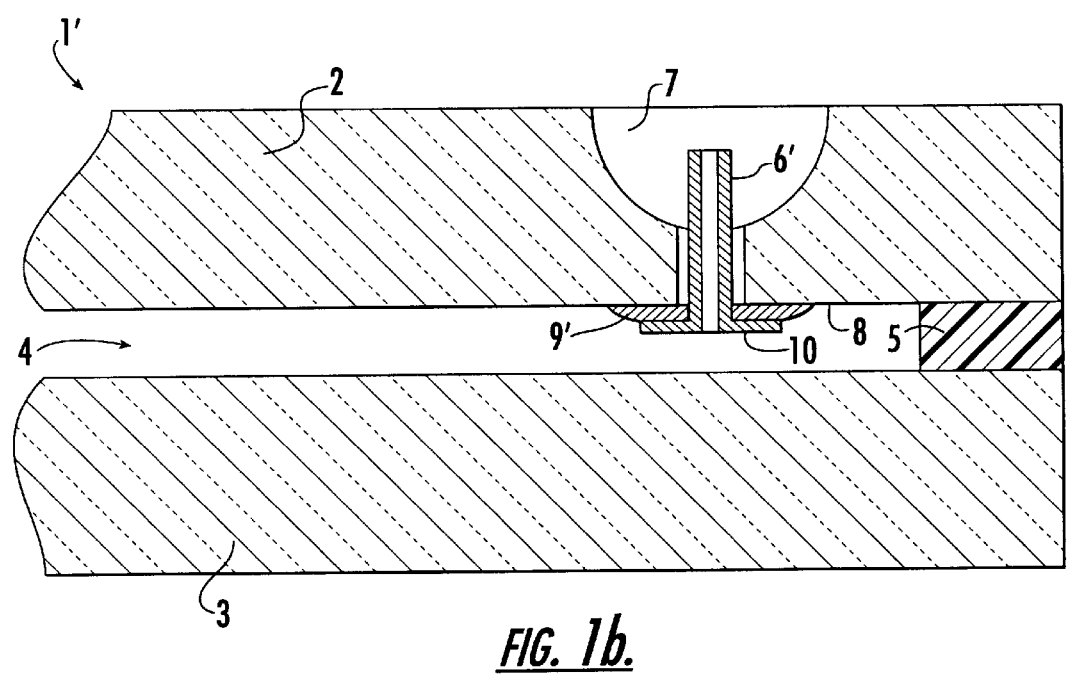
FIG. 1*b* is a sectional view through the edge of a thermally insulating glass panel showing a pump-out tube arrangement embodying the present invention.

FIG. 1*b*, in contrast, shows part of glass panel 11 in which a pump-out tube 61 has a radial flange 10 on its inner end. Tube 61 is sealed to the interior surface 8 of glass sheet 2 by solder glass 9' deposited between flange 10 and inner surface 8. The solder glass is melted at high temperatures, created during the fabrication process, and flows into the gap formed between flange 10 and interior surface 8 to form a very strong joint. Because solder glass 9' is constrained by flange 10 and inner surface 8, it is not so prone to the formation of cracks due to the differential thermal expansion between the solder glass and the glass of sheets in the pump-out tube.

Although the invention has been described with reference to a particular embodiment it should be appreciated that they may be embodied in other ways, for instance flange 10 need not be positioned at the extreme end of pump-out tube 61.

What is claimed is:

1. A thermally insulating glass panel, comprising two spaced apart sheets of glass enclosing a low pressure space and interconnected by a glass solder edge seal and an array of support pillars, and further comprising a pump-out tube which penetrates one of the glass sheets and has a radial flange which is cemented to the inner surface of that glass sheet.

2. A panel according to claim 1, wherein the flange is cemented to the interior surface of the glass sheet by the use of solder glass.

3. A panel according to claim 1, wherein the pump-out tube extends from the interior of the panel through one of the glass sheets to a recess in the outer surface of that sheet such that the tube does not extend beyond the outer surface of the glass sheet.

4. A method of constructing a thermally insulating glass panel comprising two spaced apart sheets of glass enclosing a low pressure space interconnected by a solder glass edge seal and an array of pillars, the method including the step of installing a pump-out tube through one of the glass sheets, whereby the pump-out tube has a radial flange which is sealed to the interior surface of the glass sheet.

* * * * *